United States Patent Office 3,238,153
Patented Mar. 1, 1966

3,238,153
PROCESS FOR THE PRODUCTION OF STRONGLY ACID CATION EXCHANGERS
Walter Hagge and Günther Naumann, Leverkusen, Germany, assignors to Farbenfabriken Bayer Aktiengesellschaft, Leverkusen, Germany, a German corporation
No Drawing. Filed Aug. 14, 1962, Ser. No. 216,720
Claims priority, application Germany, Sept. 20, 1961, F 34,953
5 Claims. (Cl. 260—2.2)

The invention relates to a process for obtaining cation exchangers by a novel sulfonation process of polymers of a monovinyl aromatic compound and a cross-linking agent and to cation exchange resin having a high sulfonation degree and increased capacities.

Various processes are known for the production of sulfonated cross-linked polystyrene resins. They are all characterized in that, by means of known sulfonation agents, such as sulfuric acid monohydrate, chlorosulfonic acid, fuming sulfuric acid (oleum), possibly with addition of catalysts, the cross-linked styrene polymer, generally in bead form, is treated at high temperature.

In order to obtain in this way products having satisfactory mechanical and chemical stability, limits are set with the aforementioned sulfonation processes to the use of temperature and sulfur trioxide-concentration of the sulfonation agent. The usual industrial sulfonation methods depend, for example, on the use of sulfuric acid monohydrate (which in practice has no or only a small content of additional $SO_3$) and at a reaction temperature of about 100° C.

With the method of production of this type of exchanger as already described, it is possible in practice only to introduce one sulfo group for each aromatic nucleus. It is true that by using increased temperatures and/or sulfonation agents with a higher $SO_3$ concentration, products with an increased content of sulfonic acid groups up to the disulfonation of the aromatic nuclei can be obtained.

However, these resins do not satisfy industrial requirements, since they break easily and also show colored discharges on account of poor chemical stability.

In order nevertheless to produce sulfonic acid resins of this type with increased capacity and simultaneously satisfactory mechanical and chemical stability, the necessity consequently arose of finding more gentle sulfonation agents, which contain another less aggressive agent than sulfur trioxide and at the same time permit the use of higher reaction temperatures.

It has now been found that phosphorus pentoxide-sulfuric acid mixtures or solutions satisfy the aforementioned requirements as regards the sulfonation conditions and that cation exchangers with improved properties are obtained by the use thereof. These mixtures advantageously contain 5 to 30 percent of phosphorus pentoxide. The sulfonation itself is generally carried out at temperatures from 100 to 180° C., advantageously 130 to 150° C. The sulfonation reaction may be effected on various forms of cross-linked styrene polymers, e.g. powder, bead or pellet. The cross-linked polymers being sulfonated comprise copolymers of monovinyl-aromatic compounds and divinyl-aromatic compounds. The group of monovinyl-aromatic compounds includes styrene, methylstyrenes/chlorostyrenes and the divinyl-aromatic compound is preferably divinyl-benzene.

Under the usual conditions of a sulfonation of cross-linked styrene polymers, exchanges having the properties described in the following table are obtained with phosphorus pentoxide-sulfuric acid monohydrate mixtures or solutions by varying the temperature and experimental time in comparison with commercial cross-linked styrene sulfonic acid resins which are available under the trade names Dowex 50, Amberlite JR–120, Chempro C–20 and Permutit Q.

SULFONATION OF CROSS-LINKED STYRENE POLYMERS WITH $P_2O_5$-MONOHYDRATE

| No. | Temp. of exp. | Time, hours | Useful vol. cap., g. CaO/lit. resin | Total vol. cap., mval./ml. resin | Total weight cap., mval./g. resin | S-content in weight percent | Grain form |
|---|---|---|---|---|---|---|---|
| 1 | 130° | 24 | 53 | 2.8 | 5.2 | 18.7 | Very good. |
| 2 | 130° | 9 | 54 | 2.9 | 4.9 | 19.2 | Do. |
| 3 | 130° | 4 | 52 | 2.8 | 4.9 | 18.0 | Satisfactory. |
| 4 | 150° | 9 | 58 | 2.9 | 4.9 | 19.5 | Good. |
| 5 | 150° | 4 | 57 | 2.9 | 4.6 | 19.0 | Very good. |
| For comparison Normal commercial cross-linked styrene-sulfonic acid resins | | | 40–44 | 2.1–2.3 | 4.5–4.8 | 14–15 | |

The resins obtained according to the invention are dark brown, bead-like cation exchangers with good stability and the greatly improved exchange properties which are apparent from the above table. The sulfonation of the styrene polymer being cross-linked with at least 5 percent by weight of divinyl benzene yields an infusible, insoluble sulfonated copolymer containing at least 18 percent by weight of sulfur, said sulfonated copolymer having a total volume capacity of at least 2.8 mval./ml. resin. The examples which are hereinafter described serve for more fully characterising the method of production, the parts indicated in said examples being parts by weight.

*Example 1*

125 parts of a polystyrene cross-linked with 8 percent of divinyl benzene are introduced at room temperature with extrenal cooling and constant stirring into a solution of 200 parts of phosphorus pentoxide in 1000 parts of sulfuric acid monohydrate. After about 1 hour, the mixture is heated within 1 to 2 hours to 130° C. and kept at this temperature for 9 hours. After cooling, the reaction mixture is first of all diluted with 200 parts of 80 percent sulfuric acid and then with water, while cooling with ice, until no further heat effect occurs. The sulfonated resin is finally separated from the reaction liquid by filtration, neutralized with common salt and washed with warm and cold demineralized water. The cation exchanger has the properties mentioned under No. 2 in the table.

*Example 2*

125 parts of a polystyrene cross-linked with 8 percent of divinylbenzene are introduced at room temperature and with external cooling and constant stirring into a solution of 170 parts of phosphorus pentoxide in 1000 parts of sulfuric acid monohydrate. After about 1 hour, the mixture is heated within 1 to 2 hours to 150° C. and kept at this temperature for 4 hours. The working-up takes place as more fully described in Example 1. The cation exchanger has the properties mentioned under No. 5 in the table.

We claim:
1. A process for the manufacture of a strongly acid cation-exchange resin from a cross-linked polymer of a monomeric vinylaromatic compound, which comprises sulfonating the cross-linked polymer with a sulfonating agent consisting of sulfuric acid and about 5-30 percent by weight of phosphorus pentoxide, calculated on the weight of the mixture of sulfonating agent and pentoxide, the sulfonation being carried out at a temperature of about 100-180° C.

2. Process according to claim 1, wherein the sulfuric acid is sulfuric acid monohydrate.

3. Process according to claim 1, wherein the cross-linking is effected with divinyl benzene.

4. Process of claim 1, wherein the sulfonation is carried out with a mixture consisting of sulfuric acid monohydrate and phosphorus pentoxide at a temperature of about 130-150° C.

5. The process according to claim 1, wherein the sulfonation is carried out with a solution of phosphorus pentoxide in the sulfonating agent.

References Cited by the Examiner
UNITED STATES PATENTS

| | | | |
|---|---|---|---|
| 2,500,149 | 3/1950 | Boyer | 260—79.3 |
| 2,645,621 | 7/1953 | D'Alelio | 260—2.2 |
| 2,694,086 | 11/1954 | Mitchell | 260—686 |
| 2,733,231 | 1/1956 | Bauman | 260—79.3 |
| 3,072,618 | 1/1963 | Turbak | 260—79.3 |
| 3,158,583 | 11/1964 | Corte et al. | 260—2.2 |

WILLIAM H. SHORT, *Primary Examiner.*